Patented Mar. 26, 1940

2,195,088

UNITED STATES PATENT OFFICE 2,195,088

SULPHONATED KETONES

Helmut Keppler, Leverkusen-Wiesdorf, and Rudolf Schroeter, Leverkusen-Schlebusch, Germany, assignors to I. G. Farbenindustrie Aktiengesellschaft, Frankfort - on - the - Main, Germany No Drawing. Application April 18, 1939, Serial No. 268,522. In Germany April 30, 1938

4 Claims. (Cl. 260—503)

The present invention relates to sulphonated ketones.

It is known to produce water-soluble products from symmetric higher aliphatic ketones which are obtainable by distilling the calcium salts of acids of vegetable, animal, mineral or synthetic origin, by treating the said ketones with strong sulphonating agents. Ketones which have been sulphonated in this way are, for instance, palmitone, oleon and stearone. Sulphonation could be carried out in the presence of water-binding agents or catalytically acting substances and/or of indifferent organic solvents. It has also been proposed to use such sulphonation products in the treatment of textiles, for instance, as softening, wetting and cleansing agents.

Sulphonation of such symmetric ketones does not take place very easily. Higher temperatures, large quantities of a strong sulphonating agent and, if catalysts are used, large amounts of the same are necessary in order to obtain clearly water-soluble products. It has been established that under such conditions a relatively large amount of the ketone is several times sulphonated; the properties of such polysulphonated products, however, are not so good in some respect when compared with mono-sulphonated compounds. On the other hand, if sulphonation is carried out under milder conditions, the products will not become completely water-soluble, since part of the starting material remains unsulphonated. Isolation of the mono-sulphonated products from this mixture is too complicated and expensive as to come into question.

We have now found that new products of improved properties can be obtained on a similar basis by sulphonating ketones of the general formula R—CO—R₁, in which R is an aliphatic, cycloaliphatic or hydrogenated aromatic-aliphatic hydrocarbon radical having at least 6 carbon atoms directly connected with each other, and R₁ is a saturated aliphatic hydrocarbon radical having at the most 4 carbon atoms directly connected to each other. The hydrocarbon radicals may be straight or branched. Sulphonation of such ketones proceeds very uniformly under relatively mild conditions so that perfectly water-soluble products which mainly consist of the corresponding monosulphonic acids can be obtained therefrom in a very good yield. The properties of these products are, therefore, superior in many respects to those of the above mentioned known sulphonation products of higher symmetric aliphatic ketones.

It may be mentioned at this point that it is also known to halogenate ketones of the general formula R′—CO—R′₁, in which R′ is an aliphatic hydrocarbon radical of more than 8 carbon atoms and R′₁ is an aliphatic hydrocarbon radical of less than 5 carbon atoms, and to exchange the halogen atom for the sulpho group by reaction with alkali sulphite. The products obtained thereby were to be used as wetting, dispersing and cleansing agents. Their properties, however, are inferior to those of our new products which are obtained by direct sulphonation; moreover, the above process is complicated and thereby more expensive than the present simple and cheap sulphonation method.

As starting material for the present production of our new products there may be mentioned ketones of the above general formula in which R is a hydrocarbon radical corresponding to the radicals of one of the following acids: lauric acid, palmitic acid, stearic acid, mixtures of saturated fatty acids as are obtained from natural fats, oils or by oxidation of paraffins—if necessary, after hydrogenation—of naphthenic acids, resin acids, hexahydrobenzoic acid, hydroabietic acid, and R₁ is the methyl, ethyl, propyl or butyl radical. Moreover, there may be further mentioned ketones which are obtainable by condensation of suitable aldehydes with suitable ketones and reducing the double bond of the condensation product.

Sulphonation is carried out according to known methods by treating the said ketones with concentrated sulphuric acid, monohydrate, oleum, chlorosulphonic acid etc., if desired at elevated temperature. When solid ketones are to be employed, sulphonation is preferably carried out in an indifferent solvent like for instance benzene, chlorinated aliphatic hydrocarbons etc. From small quantities of unsulphonated starting material the reaction products can be easily freed by heating under reduced pressure, or by extracting their aqueous solutions or the solid products, for instance, with benzine, gasoline etc.

It has been found to be especially advantageous to sulphonate the products dissolved in a so-called "active solvent", i. e. derivatives of low molecular aliphatic carboxylic acids, especially anhydrides, halides and nitriles, or ethers, like for instance dimethyl-, diethyl-, dibutylether, dioxane, tetrahydrofurane etc. When using such solvents the reaction can be carried out with about the calculated amount of sulphonating agent in very short time and with excellent yield. No further purification of the reaction products is necessary in this case.

Our new sulphonation products are very resistant to hard water, to acids and alkalies. Especially when their molecular weight is not too high, they are soluble even in liquids containing large amounts of electrolytes, for instance, in mercerizing lyes. The higher molecular sulphonation products give with water strongly foaming solutions having a good wetting, emulsifying, dispersing and cleansing action. The products are also very well suitable as softeners for textiles or as dyeing assistants, for instance as equalizing agents.

Our invention is furthermore illustrated by the following examples without being limited thereto. The parts are by weight, if not otherwise stated.

*Example 1*

225 parts of undecylpropyl ketone having a melting point of 28° C. are dissolved in 120 to 130 parts of acetic acid anhydride; in the course of one hour 120 parts of chlorosulphonic acid are added to the solution while stirring and cooling to 25° C. The homogeneous sulphonation mass is left standing at room temperature for about 4 to 6 hours and is thereupon introduced into a mixture of 350 to 400 parts of volume of 34% caustic soda lye and ice, while stirring; the temperature is kept at about 25 to 35° C. The reaction of the aqueous solution is kept alkaline. After 1 to 2 hours' stirring, the solution is warmed to 80° C. It is then left standing for some time, whereupon the salt solution at the bottom is extracted; about 500 parts of a slimy colored mass remain which can be lightened by stirring with some chlorine lye. This mass dissolves easily in warm water; the solution foams strongly and possesses a very well wetting action.

If, instead of the undecylpropyl ketone, 185 parts of a ketone prepared from coconut fatty acid and acetic acid are used, a clear solution containing about 15% of the reaction product is obtained after neutralization of the sulphonation mass with caustic soda lye of about 10% strength. This product dissolves clearly in a mercerizing lye of 32° Bé.

*Example 2*

565 parts of heptadecylmethyl ketone (melting point 40 to 41° C.) are dissolved in a mixture of 240 parts of acetic acid anhydride and 300 parts of carbon tetrachloride. The mixture is sulphonated at about 20 to 30° C., while adding 195 parts of 30% oleum or 130 parts of monohydrate. After having kept the mass standing for 15 hours at normal temperature it is poured on a mixture of ice and of an excess caustic soda lye of 34% strength and is thereupon stirred for about 2 hours at 30° C.; after stirring is stopped, soon a pasty brown mass separates which can be isolated by withdrawing the salt liquor or by filtration through a folded filter. In this manner about 1450 parts of a light brown reaction product are obtained which is clearly soluble in hot water and which can be freed from salt and water by drying and extracting with organic solvents, as for instance alcohol. The product shows a good wetting-, dispersing- and equalizing capacity.

Highly valuable products are also obtained by employing acetonitrile or acetyl chloride or ether when sulphonating, instead of acetic acid anhydride.

A product which is especially suitable as laundry washing agent is obtained by sulphonating heptadecylmethyl ketone in carbon tetrachloride solution by means of an equal amount of 30% oleum.

*Example 3*

140 parts of a mixture of methyl ketones, obtained from paraffin fatty acids (a mixture of fatty acids obtained by the oxidation of paraffine) of the average molecular weight of 142 and from acetic acid, are stirred for several hours at 20 to 30° C. with 270 parts of 30% oleum. The sulphonation mass is thereupon stirred into a mixture of 420 parts by volume of 34% aqueous caustic soda solution and 800 parts of ice. A clear, darkly colored solution is obtained which can be clarified by adding some hydrogen peroxide. This solution remains completely clear when stirred into a great excess of aqueous caustic soda solution of 32° Bé.

The sulphonation of the paraffin methyl ketones may also be carried out in a carbon tetrachloride, ether, acetic acid, acetic acid ethyl ester etc.

When sulphonating the corresponding butyl paraffin ketones with chlorosulphonic acid in the presence of propionic acid anhydride, the resulting product is distinguished by a very good wetting capacity in baths which are poor in electrolytes.

*Example 4*

250 parts of a ketone-mixture prepared from naphthenic acid and acetic acid are dissolved in 500 parts of diethyl ether and sulphonated by slowly adding 190 parts of chlorosulphonic acid at 20 to 25° C. The sulphonation-mixture is kept standing for some time and is then stirred, while cooling with ice, into excess dilute aqueous caustic soda lye; stirring is continued for some hours. After stirring is stopped, the liquor containing the sulphonation product can be separated from the ether layer. The liquor is then neutralized and evaporated to dryness. The reaction product can be isolated by extraction with alcohol. The substance thus obtained is clearly soluble in water; the solutions show a good dispersing capacity.

Instead of the lowly boiling inflammable diethyl ether, the higher boiling dibutyl ether can be employed at the sulfonation; also dioxane or ethylbutylether may be used as solvent.

*Example 5*

170 parts of methyl ketone obtained by condensing $\alpha$-ethylhexyl aldehyde with acetone and hydrogenating the double bond, are sulfonated with chlorosulphonic acid in the presence of butyric acid chloride. The sulphonation mass is worked up as described in Example 3. The reaction product dissolves clearly in water, which may contain considerable quantities of salts, and yields foaming solutions therewith.

*Example 6*

340 parts of an asymmetric ketone obtained from hydroabietic acid and butyric acid are dissolved in ether and treated with 120 parts of chlorosulphonic acid at 20 to 30° C. The solution is kept standing for some time and is then stirred into an excess dilute caustic soda lye. The ether is evaporated after neutralizing the free alkali and the remaining aqueous solution is evaporated to dryness. Thus a product is obtained which is clearly soluble in water, the solutions of which foam strongly and show a good washing, wetting and dispersing capacity.

If instead of the above-mentioned ketone, a resinic acid alkylketone is used, the sulphonation product can be used as capillary active substance and also as finishing agent.

We claim:

1. Process for preparing new sulphonation products which comprises directly sulphonating a ketone of the general formula R—CO—R$_1$ in which R is a saturated aliphatic, cycloaliphatic or hydrogenated aromatic-aliphatic hydrocarbon radicle containing at least 6 carbon atoms directly connected to each other, and R$_1$ is a saturated aliphatic hydrocarbon radicle containing at the most 4 carbon atoms directly connected to each other.

2. Process for preparing new sulphonation products which comprises directly sulphonating a ketone of the general formula R—CO—R$_1$ in which R is a saturated aliphatic, cycloaliphatic or hydrogenated aromatic-aliphatic hydrocarbon radicle containing at least 6 carbon atoms directly connected to each other, and R$_1$ is a saturated aliphatic hydrocarbon radicle containing at the most 4 carbon atoms directly connected to each other, the ketone being dissolved in an active solvent selected from the group consisting of functional derivatives of low molecular aliphatic carboxylic acids, and ethers.

3. As new products, the products of the direct sulphonation of ketones of the general formula R—CO—R$_1$ in which R is a saturated aliphatic, cycloaliphatic or hydrogenated aromatic-aliphatic hydrocarbon radicle containing at least 6 carbon atoms directly connected to each other, and R$_1$ is a saturated aliphatic hydrocarbon radicle containing at the most 4 carbon atoms directly connected to each other.

4. As new products monosulphonates having been obtained by direct sulphonation of ketones of the general formula R—CO—R$_1$ in which R is a saturated aliphatic, cycloaliphatic or hydrogenated aromatic-aliphatic hydrocarbon radicle containing at least 6 carbon atoms directly connected to each other, and R$_1$ is a saturated aliphatic hydrocarbon radicle containing at the most 4 carbon atoms directly connected to each other.

HELMUT KEPPLER.
RUDOLF SCHROETER.